F. MEISSNER.
SHEARS AND SCISSORS.
APPLICATION FILED FEB. 23, 1910.

985,048.

Patented Feb. 21, 1911.

Witnesses:
John Murtagh
L. J. Murphy

Inventor
Fritz Meissner
By his Attorneys

UNITED STATES PATENT OFFICE.

FRITZ MEISSNER, OF AMPERE, EAST ORANGE, NEW JERSEY.

SHEARS AND SCISSORS.

985,048.

Specification of Letters Patent. Patented Feb. 21, 1911.

Application filed February 23, 1910. Serial No. 545,298.

*To all whom it may concern:*

Be it known that I, FRITZ MEISSNER, a subject of the King of Prussia, residing in Ampere, East Orange, in the county of Essex and State of New Jersey, have invented certain new and useful Improvements in Shears and Scissors, of which the following is a specification.

This invention relates to an improvement in shears and scissors in which by the interposition of an intermediate lever mechanism between the lower and upper blades the cutting power of the upper blade of the shears is considerably increased, and thereby the force required for operating the shears considerably diminished, so that the same are specially applicable for use for cutting sheet metal, surgical bandages, cloth, paste-board and other substances; and for this purpose the invention consists of a pair of shears which comprises a lower blade provided with a handle, an upper blade having an enlarged shank with an inclined slot in its shank, a supporting arm pivoted to the shank of the lower blade, a presser-lever provided with an angular or elbow-shaped outer end fulcrumed at its angle to the upper end of the supporting arm, said presser-lever having a handle crossing the shank of the lower blade, a pivot-screw passing through the inclined slot of the upper blade and a hole in the lower blade and a pivot-strap connecting the angular end of the presser-lever with the pivot-screw.

The invention consists further of certain details of construction which will be fully described hereinafter and finally pointed out in the claims.

Figure 1:
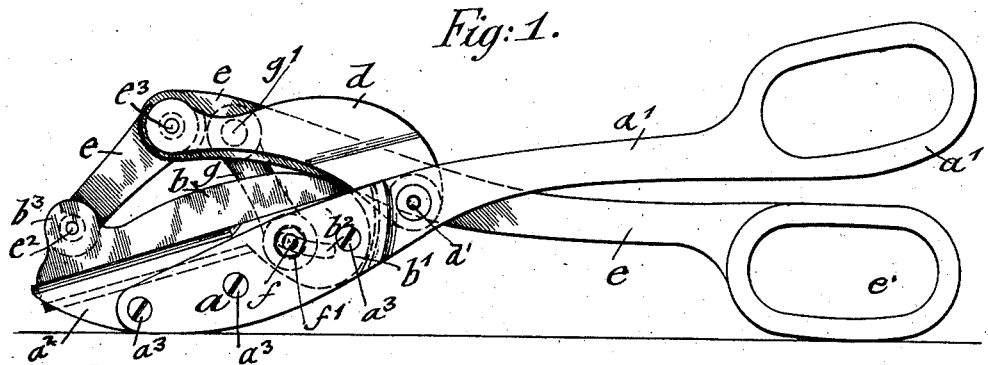
Figure 2:
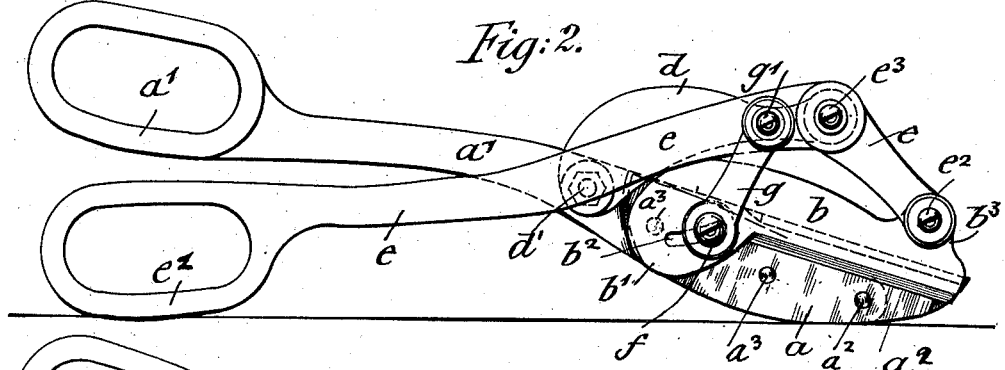
Figure 3:
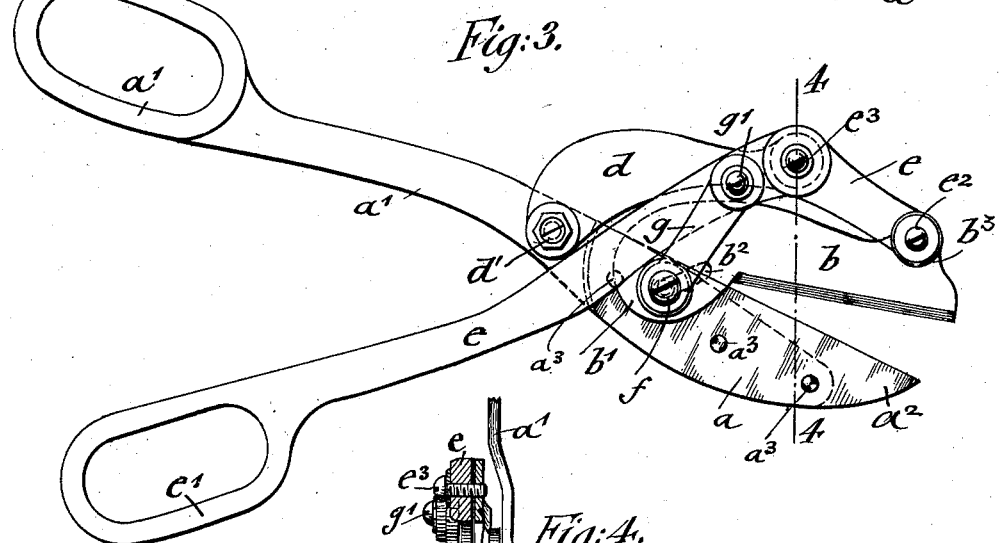
Figure 4:
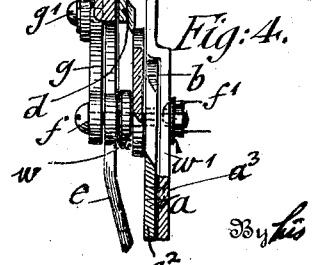

In the accompanying drawings, Figures 1 and 2 represent side-elevations of my improved shears, showing them respectively from opposite sides, and with the blades in closed position, Fig. 3 is also a similar side-elevation showing the blades in open position, and Fig. 4 is a vertical transverse section on line 4, 4, Fig. 3.

Similar letters of reference indicate corresponding parts throughout the several figures.

Referring to the drawings, $a$ represents the lower blade, which is provided with a handle $a^1$ of the usual shape, and $b$ is the upper blade of the improved shears. The shank of the lower blade is provided with two holes, one for the insertion of a pivot-screw $f$ which passes through the lower and upper blades $a$, $b$, while the second hole $o^1$ serves for the insertion of a pivot-pin $d^1$ to which the lower end of the supporting arm $d$ of a presser-lever $e$ is pivoted. The presser-lever $e$ is provided with an angular or elbow-shaped upper end and fulcrumed at its angle to the supporting arm $d$, while the shank of the presser-lever crosses the shank of the lower blade and is provided with a handle $e^1$. The upper blade $b$ is cut off near the pivot-screw $f$ and provided with an enlarged shank $b^1$ having an inclined slot $b^2$ that is guided on the pivot-screw $f$ of the blades. The pivot-screw $f$ is also connected by a pivot-strap $g$ with a pivot-pin $g^1$ on the presser-lever $e$ near its fulcrum $e^3$ with the supporting arm $d$, while the outer end of the presser-lever is connected by a screw-pivot $e^2$ with a lug $b^3$ at the outer end of the blade $b$. Washers $w$, $w^1$ are interposed between the pivot-strap $g$ and the upper blade $b$ and between the lower blade and the nut $f^1$ of the pivot-screw $f$, as shown clearly in Fig. 3. For regulating the pressure between the blades, the screw-nut $f$, is screwed tighter or looser on the threaded shank of the pivot-screw $f$, so that its head bears with greater or lesser force on the blades $a$, $b$.

The shank of the lower blade $a$ is provided with a detachable cutting blade $a^2$ that is applied by metal-screws $a^3$ to the front end of the shank $a^1$ so as to be easily detached when worn out. As the upper blade $b$ is detachable by removing the pivot-screw $f$ and unscrewing the pivot from the lug $b^3$ and presser-lever $e$, the blades can be readily removed after the cutting edges are worn out and supplied with a new lower cutting blade on the shank-portion of the lower blade and a new upper blade in connection with the presser-lever and lug of the upper blade, in the same manner as the worn out blades were connected with these parts.

The operation of my improved shears is as follows: By moving the handle of the lower blade away from the handle of the presser-lever, the upper blade is turned on the pivot-screw and simultaneously drawn back by the action of the pivot-strap connecting the presser-lever with the pivot-screw of the blades, so that a shear cut is exerted by the edges of the upper blade and lower blade on the substance to be cut when the handles are subsequently drawn together. The increased leverage which is imparted by the presser-lever to the upper blade permits a greater force to be exerted, while the working of the shears is rendered easier, so that the workman can operate them for a longer time with less fatigue. When made in a larger size, the shears can be used for cutting sheet-metal, in which case both handles may be used in operating the shears; while when made in a medium size, the shears can be used for cutting heavy cloth and similar fabrics, while when made in a smaller size they can be used as scissors. By means of the presser-lever and its pivot-connection with the upper blade the opening and closing of the blades is facilitated, and the cutting operation accelerated, so that the shears can be used with special advantage by metal workers, surgeons, book-binders, and others.

Having thus described my invention, I claim as new and desire to secure by Letters Patent:

1. A pair of shears, consisting of a lower blade provided with a handle, an upper blade provided with an enlarged shank provided with an inclined guide-slot near its pivot connection with the lower blade, a forwardly-extending supporting arm pivoted to the shank of the lower blade, a presser-lever provided with a handle at its rear-end and an angular or elbow-shaped arm at its forward end, said presser-lever being fulcrumed to the upper end of the supporting arm, and the outer end of the upper blade, a pivot-screw connecting the lower and upper blades, and a pivot-strap between the pivot-screw and the forward end of the presser-lever.

2. A pair of shears consisting of a lower blade provided with a handle, an upper blade having an enlarged shank provided with an inclined guide-slot near its pivot connection with the lower blade and with a lug at its outlet end, a supporting arm pivoted to the shank of the lower blade, a presser-lever provided with a shank extending across the shank of the lower blade at its rear-end and an angular or elbow-shaped forward-end, said presser-lever being fulcrumed at its angle to the upper end of the supporting arm and at its outer end to the lug on the upper blade, a pivot-screw for the upper and lower blades, and a pivot-strap connecting the pivot-screw with the presser-lever near its fulcrum with the supporting arm.

3. A pair of shears consisting of a shank for the lower blade provided with a handle and with a removable cutting blade, a detachable upper blade provided with an enlarged shank and a perforated lug at its outer end, said shank having an inclined guide-slot near its pivot connection with the lower blade, a supporting arm pivoted to the shank of the lower blade, a presser-lever provided with a handle at its lower end and an angular or elbow-shaped forward end fulcrumed at its angle to the upper end of the supporting arm and at its outer end by a screw-pivot with the upper blade, a pivot-screw connecting the upper and lower blades, and a pivot-strap connecting the pivot-screw with a point on the presser-lever near its fulcrum-connection with the supporting arm.

In testimony, that I claim the foregoing as my invention, I have signed my name in presence of two subscribing witnesses.

FRITZ MEISSNER.

Witnesses:
FANNIE FISK,
PAUL GOEPEL.